United States Patent
Domingues et al.

(10) Patent No.: US 9,226,519 B2
(45) Date of Patent: Jan. 5, 2016

(54) MICROWAVE FOAM PRODUCT

(75) Inventors: David J. Domingues, Plymouth, MN (US); Debra L. Patterson, Minnetonka, MN (US); Stefan Bucher, Maple Grove, MN (US)

(73) Assignee: General Mills, Inc., Minneapolis, MN (US)

( * ) Notice: Subject to any disclaimer, the term of this patent is extended or adjusted under 35 U.S.C. 154(b) by 1170 days.

(21) Appl. No.: 12/350,369

(22) Filed: Jan. 8, 2009

(65) Prior Publication Data

US 2009/0208615 A1    Aug. 20, 2009

Related U.S. Application Data

(60) Provisional application No. 61/028,701, filed on Feb. 14, 2008.

(51) Int. Cl.
| | |
|---|---|
| A23G 3/00 | (2006.01) |
| A21D 13/00 | (2006.01) |
| A21D 10/02 | (2006.01) |
| B65D 8/00 | (2006.01) |
| B65D 81/34 | (2006.01) |
| A21D 6/00 | (2006.01) |
| A21D 10/00 | (2006.01) |
| A21D 10/04 | (2006.01) |
| A23L 1/01 | (2006.01) |
| A23L 1/00 | (2006.01) |
| A23L 1/187 | (2006.01) |

(52) U.S. Cl.
CPC ............. *A23L 1/0128* (2013.01); *A23L 1/0097* (2013.01); *A23L 1/1875* (2013.01)

(58) Field of Classification Search
CPC .... A23L 1/0128; A23L 1/0097; A23L 1/1875
USPC ............. 426/107, 94, 95, 496, 498, 549, 552, 426/553
See application file for complete search history.

(56) References Cited

U.S. PATENT DOCUMENTS

| | | | | |
|---|---|---|---|---|
| RE21,406 E | * | 3/1940 | Vogt | ................................... 62/69 |
| 3,914,453 A | * | 10/1975 | Gawrilow | ..................... 426/553 |
| 4,020,186 A | * | 4/1977 | Edwards | ......................... 426/36 |

(Continued)

FOREIGN PATENT DOCUMENTS

| | | |
|---|---|---|
| EP | 1337153 B1 | 11/2001 |
| WO | WO 02/13618 | 2/2002 |

(Continued)

OTHER PUBLICATIONS

Product information website for Goodway available at http://web.archive.org/web/19991124131659/www.goodwaysales.com/mixers/mixers.htm.*

(Continued)

*Primary Examiner* — Rena L Dye
*Assistant Examiner* — Assaf Zilbering
(74) *Attorney, Agent, or Firm* — Diederiks & Whitelaw, PLC; John L. Crimmins

(57) ABSTRACT

Shelf stable microwave dessert packaged food products for individual servings comprise a cup; a shelf-stable ready-to-heat uncooked microwave bakeable foam product disposed within the cup, and a peelably removable, low gas permeability sealing membrane. The articles provide high quality finished expanded baked dessert goods by microwave cooking and expansion of the foam.

26 Claims, 1 Drawing Sheet

(56) References Cited

U.S. PATENT DOCUMENTS

| | | | |
|---|---|---|---|
| 4,803,088 A * | 2/1989 | Yamamoto et al. | 426/107 |
| 5,015,486 A | 5/1991 | Franssell et al. | |
| 5,035,904 A | 7/1991 | Huang et al. | |
| 5,071,668 A | 12/1991 | Van Lengerich et al. | |
| 5,101,084 A * | 3/1992 | Atwell et al. | 426/107 |
| 5,178,893 A | 1/1993 | Seewi et al. | |
| 5,643,625 A * | 7/1997 | Perry et al. | 426/395 |
| 5,800,724 A * | 9/1998 | Habeger et al. | 216/35 |
| 5,804,233 A * | 9/1998 | Lonergan et al. | 426/19 |
| 6,039,994 A | 3/2000 | LeFlecher et al. | |
| 6,165,524 A | 12/2000 | Narayanaswamy et al. | |
| 6,224,924 B1 * | 5/2001 | Narayanaswamy et al. | 426/128 |
| 6,224,925 B1 * | 5/2001 | Narayanaswamy et al. | 426/128 |
| 6,228,403 B1 * | 5/2001 | Narayanaswamy et al. | 426/128 |
| 6,261,613 B1 | 7/2001 | Narayanaswamy et al. | |
| 6,322,830 B1 | 11/2001 | LeFlecher et al. | |
| 6,759,070 B1 | 7/2004 | Narayanaswamy et al. | |
| 2002/0061353 A1 | 5/2002 | McPherson et al. | |
| 2004/0156972 A1 * | 8/2004 | Nishide et al. | 426/601 |
| 2005/0129823 A1 * | 6/2005 | Dohl et al. | 426/549 |
| 2006/0029708 A1 | 2/2006 | Fukumori | |
| 2006/0191934 A1 | 8/2006 | Kreisman et al. | |
| 2007/0042099 A1 | 2/2007 | Stanton | |
| 2007/0042102 A1 * | 2/2007 | Furcich | 426/631 |
| 2007/0065554 A1 | 3/2007 | O'Connor et al. | |
| 2007/0110856 A1 | 5/2007 | Kanzaki | |
| 2007/0259090 A1 | 11/2007 | Taylor et al. | |
| 2009/0208615 A1 * | 8/2009 | Domingues et al. | 426/107 |
| 2010/0173046 A1 * | 7/2010 | Lisa | 426/107 |
| 2011/0123682 A1 * | 5/2011 | Perry et al. | 426/107 |

FOREIGN PATENT DOCUMENTS

| | | |
|---|---|---|
| WO | WO 2006/008357 A1 | 12/2006 |
| WO | WO 2007/013007 A2 | 2/2007 |

OTHER PUBLICATIONS

Microstructural study of frozen batter-coated squid rings prepared by an innovative process without a pre-frying step, Llorca et al., Food Hydrocolloids 19, p. 297-302 (2005).*

Egg volumes from Indiacurry.com available at www.indiacurry.com/eggvolume.htm.*

Butter density from southernfood.about.com available at southernfood.com/library/info/blequivb.htm.*

The Palmer House chocolate fudge brownie recipe (Dec. 5, 2007) available at http://www.suntimes.com/recipes/desserts/681652,food-news-abrownie05r.recipe.*

Fels Research Institute and Department of Chemistry, Temple University, Philadelphia, Pennsylvania, "Bailey's Industrial Oil and Fat Products", Third Edition.

Cake and Muffin Technical Help, Bakery Science, [on line] 2007—no month, retrieved Mar. 20, 2012. Retrieved from the Internet: URL:<http://bakeryscience.com/caketechhelp.html.

Machine translation of WO 02/013618, Feb. 2002.

* cited by examiner

MICROWAVE FOAM PRODUCT

CROSS-REFERENCES TO RELATED APPLICATIONS

This application claims the benefit of priority under 35 U.S.C. 119(e)(1) of a provisional patent application, Ser. No. 61/028,701, filed Feb. 14, 2008, which is incorporated herein by reference in its entity.

FIELD OF THE INVENTION

The present invention relates to packaged food products adapted for microwave cooking, to bakeable foam food compositions for such packaged food products, and to their methods of preparation. More particularly, the present invention relates to a shelf stable microwave dessert packaged food product for individual servings of expanded desserts comprising an expandable, unleavened bakeable foam.

BACKGROUND OF THE INVENTION

The present invention is directed towards a packaged food article for the microwave cooking of an individual or small portion of an uncooked farinaceous foam to provide a finished expanded dessert product such as for a dessert, e.g., a cake, muffin, or brownie. The present products are individual convenience snack or dessert items.

Of course, any number of dessert food items can be reheated in a microwave oven. For example, if desired, a previously baked slice of a cake, or a baked muffin, or baked brownie piece can be warmed by microwave heating. Moreover, any number of packaged pre-cooked consumer food products can be or are specifically adapted to reheating prior to consumption. For example, a number of sandwich or hot-dog-and-bun products are packaged in flexible film packaging that are intended to be distributed under refrigeration temperatures and microwave heated immediately prior to consumption. However, in the present invention, the microwave heating step importantly performs a cooking step involving dehydration and denaturation or coagulation of protein components. Thus, the present unfinished or uncooked products are to be distinguished from such prior art products that are already finished or substantially completely cooked. The present methods involving microwave cooking are also to be distinguished from mere microwave reheating or refreshing.

Recently, convenience packaged food products have been introduced in the United States for the microwave cooking of an individually sized portion of an expanded dessert under the Warm Delights trademark. The products are in the form of a kit comprising a first chemically leavened dessert dry mix packet or pouch (75 g); a second pouch (18 g) of topping to be applied before or after cooking; a plastic bowl; and, microwave preparation instructions. The consumer is instructed to open the dry mix packet and pour the dry mix into the bowl. The consumer is then asked to admix a small quantity, e.g., 4 teaspoons (20 mL) of water to the dry mix to form a batter in the bowl. The product is then cooked (rather than being merely reheated) by microwave heating for about 75 seconds. For brownie products, a topping can be applied to the finished baked product to form a freshly made microwave heated dessert. For cake products, the topping can be applied before the microwave cooking step. (See, for example, U.S. Ser. No. 60/649,251 "Container To Facilitate Microwave Cooking And Handling" (filed Feb. 2, 2005 by Kreisman et al.). The microwave heating step activates the chemical leavening system to provide an expanded finished dessert good. Even when such finished goods are prepared by microwave heating, such finished cooked goods are still colloquially referred to as "baked goods".

While useful, the present invention provides improvements over the Warm Delights™ dessert kit arrangement. In one respect, the present invention provides a shelf stable, ready-to-cook, dimensionally stable, expandable, farinaceous ungelatinized bakeable foam already present in the cup with optional topping for even greater preparation convenience. It will be appreciated that even greater convenience is provided to the consumer by eliminating several preparation steps required by existing commercial products, while providing a pleasing final baked texture and flavor. These steps include, inter alia: unpacking of the kit, opening of the dry mix packet, adding the dry mix to the bowl, disposing of the emptied dry mix packet packaging, measuring liquids for addition to the dry mix, mixing of the added liquids to the dry mix with a utensil, and cleaning of the mixing utensil. With current products, all of these steps must be performed prior to the microwave heating step.

One principle problem with providing such an article resides in providing a bakeable food composition for preparing an expanded finished dessert product that is shelf stable at room temperate for extended storage yet nonetheless can be baked by microwave heating to provide an expanded finished dessert good. The starting composition must contain sufficient moisture to provide a finished baked good with good eating qualities. Nonetheless, the starting composition must be shelf stable at room temperatures for considerable storage times without biological or other instability. The starting composition must be expandable to provide an expanded finished dessert good yet not contain any chemical leavening system that reacts with its moisture over its storage life. The presence of chemical leaveners negatively impacts shelf-stability due to the reaction of sodium bicarbonate with leavening acid during storage resulting in the release of carbon dioxide into the package headspace and the associated bulging of the package lid increase. A reduced pH of the batter improves stability by controlling many chemical and enzymic reactions and microbial growth.

In another aspect, the present articles are smaller in portion size. Current consumer food trends favor items that are portion controlled to provide about 100 calories per finished item.

However, providing shelf stable packaged food bakeable foam items of such controlled portion sizes presents unexpected technical challenges. The combination of a microwave absorptive food charge such as a dessert bakeable foam combined with small portions presents a difficult product tolerance challenge by microwave heating preparation. The difference between insufficient microwave heating (with undesirable unset bakeable foam) and excessive (resulting in a dry or even burnt finished product) can be quite small, e.g. 5-10 seconds. Variations in the power output of various consumer microwave ovens, whether the particular unit is equipped with a carousel, and even placement within the microwave heating cavity can exacerbate the problem of providing sufficient product preparation tolerance. As a result, it is believed that no consumer packaged food product is both small in quantity (to provide 100 calories or less) and intended for microwave cooking preparation.

The present novel foam compositions are to be understood as being fundamentally different in physical form from dessert compositions of the prior art. In the past, shelf stable products were provided in the form of dry mixes having heat activated chemical leavening systems to which the consumer added liquids to form batters. Often, the consumer would mix the dry components with home-supplied liquids, to provide aerated batters whose aeration augmented the expansion principally provided upon baking by the leavening system. The product offering of chemically leavened microwaveable desserts was more convenient than scratch baking, but still required the consumer to hydrate the batter, and clean up the mess of preparation of the batter. The resulting baked product attributes were not preferable compared to their oven-baked counterparts, but were reasonably acceptable for the improvement in convenience.

In other prior art teachings, ready-to-bake batters or doughs having a thicker consistency disposed within suitable packaging have been disclosed (See, for example, U.S. Pat. No. 6,759,070 "Inert-Gas Based Leavened Dough System" issued Jul. 6, 2004 to Venky Narayanaswamy, et al.; U.S. Pat. No. 5,178,893 "Product And Process Of Making A Room Temperature Storage Stable Dough" issued Jan. 12. 1993 To Gila Seewi et al.; U.S. Pat. No. 6,039,994 "Ready-To-Bake Shelf-Stable Cake Dough And Process For Its Manufacture" issued Mar. 21, 2000 To LeFlecher et al.; U.S. Pat. No. 6,224,924 "Shelf Stable Batter Article And Method Of Preparation" issued May 1, 2001 to Narayanaswamy et al.; US 2007/0042099 "Ready to Bake Refrigerated Batter" by Stanton published Feb. 22, 2007). However, these products are not taught as being useful for the microwave preparation of small quantities of dessert goods but by conventional oven baking preparation.

In contrast, the present bakeable foams in their uncooked or original state are not fluid like batters or plastic like doughs but are rigid i.e., dimensionally stable (albeit deformable) in consistency.

More recently, especially in Europe, prepackaged batters have been available for consumption, including some which are shelf-stable in nature. The most challenging aspect of prehydrated leavened batters is the ability to maintain shelf-life. Various approaches exist for extending shelf life, such as pH and water activity control, oxygen removal, and pasteurization. Because of the challenging nature of shelf-life extension, the final baked texture is not similar to the counterpart prepared from scratch or dry mixes. Most importantly, these prehydrated batters are formulated for conventional oven baking, not for microwave baking.

Surprisingly, the present foams exhibit extended shelf stability without significant foam collapse for over six months (when disposed within suitable moisture resistant packaging) yet nonetheless will expand upon microwave heating to form finished baked goods. In part, the present invention resides in preparing such foams in the form of low moisture formulations that exhibit high viscosities at room temperatures yet lower viscosities at the elevated temperatures achieved during microwave baking and heating that allow for expansion to provide the present desirable expanded finished baked goods. By being bakeable to form set structures upon heating, the foams do not simply collapse upon cooling after completion of the baking step. By being in the form of an expandable foam, the present foams can be free of a leavening system. Being free of a conventional leavening system, allows the present foams to enjoy extended color, flavor and pH stability.

BRIEF SUMMARY OF THE INVENTION

In its food composition aspect, the present invention resides in dessert food product, comprising a shelf stable, ready-to-cook, dimensionally stable, deformable or non-elastic closed cell, expandable, farinaceous un-gelatinized microwave bakeable foam. The foam includes about 5%-15% (dry weight basis) of an un-gelatinized farinaceous ingredient. The foam includes about 20-50% (dry weight basis) of a nutritive carbohydrate sweetening ingredient syrup. The foam additionally includes about 1-7% of an humectant. The foam additionally includes about 2%-4% (dry weight basis) of an undenatured structuring protein ingredient. The foam additionally includes about 2%-6% of a water binding fiber ingredient. The foam additionally includes about 15%-20% (dry weight basis) of fat especially an emulsified shortening ingredient. The foam additionally includes sufficient amounts of an edible organic acid and/or salts to provide a pH of about 4.5-6. The foam additionally includes about 0.5% to 4% salt. The foam additionally includes a moisture content ranging from about 10% to 20%; and, the foam's water activity ranges from about 0.60 to about 0.85. The foams are deformable and can be measured to have a viscosity that ranges from about 450,000 to 550,000 cp at a temperature of 20-40° C. The foam is in the form of on an aerated emulsion wherein the foam has an average cell size diameter of about 25 μm or less. The foam is substantially free of a chemical heat activated leavening system and/or wherein the foam is substantially free of $N_2O$ leavening.

In its consumer packaged food article aspect, the present invention resides in articles comprising a quantity of the present bakeable foam disposed within a food package including a container adapted to be used as a microwave cooking device. A container is fabricated from temperature resistant material. The package can include a sealing membrane covering the upper cup open end peelably removably sealed to the sealing surface forming an moisture barrier seal. The membrane is fabricated from a low moisture permeability sealing membrane material. The membrane sealed cup has a moisture permeability (~<0.1 g $H_2O$/100 in.$^2$/24 hr @37.7° C.;@90% Rel. Humidity). The package includes a headspace and can include a conventional atmosphere, a modified low oxygen atmosphere or a partial vacuum in the headspace. The container has interior cavity having a volume ranging from about 50 to 1250 cc. to allow for expansion of the foam upon microwave cooking of about 1.5-2× the foam's initial volume.

In a preferred embodiment of its article aspect, the present invention resides in packaged food products for extended shelf life at room temperatures that comprise about 30-60 g of an uncooked, pre-mixed or ready-to-cook farinaceous bakeable foam disposed within package of the present invention.

DETAILED DESCRIPTION OF THE INVENTION

Figure 1:
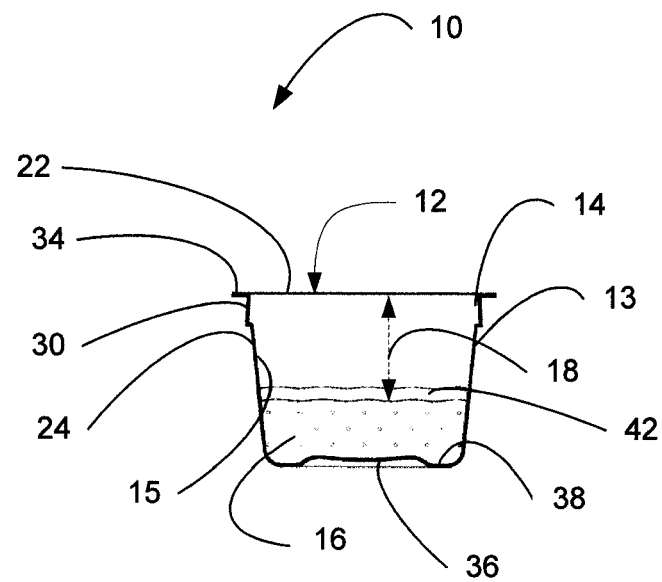
FIG. 1 is a cross sectional view, greatly enlarged, of a packaged food article of the present invention.

The present invention provides packaged food products for individual servings adapted for microwave cooking, to bakeable non-chemically leavened foam food compositions for such packaged food products, and to their methods of preparation. The products generally comprise novel shelf-stable ready-to-cook bakeable foams, articles comprising a quantity of the present bakeable foam disposed within a food package including a cup adapted to be used as a microwave cooking utensil. Each of these components as well as product properties, article preparation and use are described in detail below.

Throughout the specification and claims, percentages are by weight and temperatures in degrees Centigrade unless otherwise indicated. Each of the referenced patents or patent applications is incorporated herein by reference.

In its food composition aspect, the present invention resides in dessert food product, comprising a shelf stable, ready-to-cook, dimensionally stable, deformable non-elastic, closed cell, expandable, farinaceous ungelatinized bakeable aerated foam.

The bakeable foams herein are farinaceous, i.e., starch based bakeable foams that include flour and/or starch as the principle structuring ingredient in the finished good. In certain variations, a portion of the starch is provided by pregelatinized starch or modified starches that supplement the principle un-gelatinized or uncooked flour ingredients of the bakeable foams herein.

The term "bakeable foam" is used herein in a broad sense to refer to not only flowable starch based liquid or fluid mix compositions but also to include non-flowable farinaceous pre-mixed composition embodiments such as cookie doughs.

The present foam is shelf stable. "Shelf stable" refers to the compositions of the invention being suitable for storage at ambient temperatures (such as room temperature) without the food composition substantially breaking down by, for example, foam collapse, microbial contamination, syneresis or weeping, water accumulation, and the like, and becoming unsuitable for consumption for at least six months. By shelf stable is meant that the product dessert foam 16 should have at least a six months shelf life. Shelf life includes not only biological stability but also functional operability to provide an expanded finished cooked dessert good. Good results are obtained when the bakeable foam has a water activity ($A_w$) value of 0.85 or less at time of fabrication, preferably 0.60-0.85, most preferably about 0.75-0.80. Such low water activity values can be obtained by controlling the amount of water and adding sufficient amounts of low molecular weight ingredients (e.g., salt and/or humectants such as glycerol) to control water activity. In a preferred formulation, the bakeable foam includes about 1-8%, preferably about 2-7% glycerol.

By "uncooked" herein is meant a starch and/or flour material that is substantially un-gelatinized (i.e., no more than 8% gelatinization on average). The present bakeable foam compositions are thus to be distinguished from already baked or ready-to-eat products that can be merely reheated in a microwave oven.

By "pre-mixed" or, equivalently, "ready-to-cook", is meant that no additional ingredients or stirring in needed for the invention to be operable. This does not preclude the topical application of syrups, sauces, or added particulates to the batter. Pre-mixed bakeable foams are to be distinguished from dry mixes that require addition of liquids and mixing by the consumer to prepare a bakeable foam for cooking.

The present bakeable foam compositions depend on farinaceous ingredients based on flour and/or starch for body. The flour and/or starch level of the present foam compositions preferably ranges from about 5%-15% (dry weight basis), preferably about 5% to about 15%.

Of course, the baked goods art is well developed and a wide variety of flours and starches are well known for use in such baked goods and the skilled artisan will have no difficulty in selecting suitable farinaceous ingredients for use herein. Flours that can be used include the following or combinations of the following: hard wheat flour, soft wheat flour, chlorinated wheat flour, corn flour, soy flour, rice flour, high amylose flour, low amylose flour, combinations of the foregoing, and the like. Wheat flour is the preferred flour. Preferred for use herein for the farinaceous ingredient is a chlorinated wheat flour since such flours improve the solubility of the starch thereby improving the overall volume of the finished baked product. Also useful herein are heat treated such as a wheat flour that has gone through dry sterilization, infrared heating, microwave heating, irradiation, or any other process that would decrease the initial microbial load of the flour and would thereby enhance foam shelf life. In addition, a heat-treated flour is also favorable for enhancing the shelf life since enzymes such as amylase, lipase, peroxidase, and polyphenol oxidase are inactivated. In addition, a flour with a low iron content can help to reduce discoloration of the foam during shelf life.

Conventionally, flour is standardized to a moisture content of about 14%. Flours useful herein are of a conventional type and quality including cake flour, bread flour, and all-purpose flour. Wheat flours are preferred but other flours conventionally used in the preparation of baked goods are also employed in full or partial substitution for the wheat flour. Traditional cake flour used for layer cakes has about 8% or less protein by weight of the flour. Pastry flour ordinarily has a protein level of about 10%. Other flours such as bread flour generally have a higher protein level of about 11 to 13% by weight. One protein range for wheat flour used in the present invention is between about 9 to 10% by weight of the flour. A general all-purpose flour is also usable. This type of all-purpose flour generally comprises a mixture of both and hard and soft wheat flours, i.e., both high protein level and low protein level flours. Such flours are useful if the average protein content ranges from about 8 to 10% by weight.

While chlorinated flours are preferred for use herein, unchlorinated flours are also usable because chlorination is an expensive, though unnecessary flour processing step. Unmalted flours may be used provided the flours are derived from wheats with minimal sprout damage. Enzyme inactivated flours are also usable. In particular, flours that are free of alpha-amylase activity and have a very reduced lipasic and peroxidasic activity are usable.

Starch can be added in amounts to completely replace the flour or in amounts to partially replace the flour. A certain percentage of the starch can be modified or pre-gelatinized. However, the present farinaceous ingredient bearing foams are primarily uncooked even though a portion can be at least partially or more fully gelatinized. The modified starch can improve product strength, structure, and texture. Preferably, the modified starch is added at levels of about 0.1% to about 8.0% of the flour ingredient. Starches that can be used include the following or combinations of the following in their native or modified form: tapioca starch, corn (maize) starch, arrowroot, wheat starch, potato starch, rice starch, waxy maize starch, barley starch, sago starch, oat starch, waxy sorghum, and the like. The flour and the starch can be blended to obtain desired characteristics in the foam or baked product.

In still other variations, composite flour can be used in whole or in part as the farinaceous ingredient. A composite flour includes a starch constituent, a protein constituent and/or a fiber constituent that collectively provide component levels reminiscent of a flour ingredient. Employing composite flour rather than a natural flour can make sense depending upon such factors as the price, availability and quality of the flour or flour constituents. Also, while composite flour can be more expensive, such materials can exhibit greater shelf life due to reduced levels of enzymes compared to native flours. Such low enzyme levels of composite flours and resultant increases in shelf stability can be more preferred in certain formulation executions. For example, in the provision of lightly colored foam products (e.g., vanilla or lemon flavored), a desire to avoid browning such as to provide extended shelf stability without product discoloration can outweigh any cost disadvantage.

Inasmuch as the present invention is directed towards a product intended for cooking by the end consumer, at least a portion of the farinaceous ingredient is ungellatinized. Of course, the use of gelatinized farinaceous ingredients to some extent is contemplated such as using pre-gellatinized starch as a farinaceous ingredient. In preferred variations, the majority of the farinaceous ingredient is ungellatinized.

The present bakeable foam compositions additionally comprise about 20-50% (dry weight basis), preferably about 25-35% of a nutritive carbohydrate sweetening or sugar ingredient. In addition to providing sweetening, the sugar ingredient is important to water activity control and developing a desired batter viscosity. The sugar ingredient that can be used include the following or combinations of the following: sucrose, fructose, dextrose, corn syrup, corn syrup solids, invert syrup, high fructose corn syrup, honey, molasses, maltose, sorbose, mannose, lactose, galactose, dextrin, polydextrose, fruit juices, tapioca syrup, rice syrup including brown rice syrup, concentrated fruit juices, dried fruit powders, high maltose corn syrup, maltodextrin, and the like. In certain variations, all or a portion of the sugar ingredient can be provided in solid form. In other variations, all or a portion of the sugar ingredient can be provided by one or more sugar syrups in liquid form.

Commercially available milled sugar or sucrose usually contains up to about 4% starch as an aid to maintaining its free-flowing properties. In one variation, up to about 30% of the sugar ingredient in the present invention food products is supplied by dextrose or other nutritive carbohydrate agents such as corn syrup solids.

In certain variations, the sugar ingredient can include such materials as hydrogenated starch hydrolisates and maltitol and other like ingredients that provide both bulk and sweetness to the foam. An advantage of including sugar alcohols such as manitol is that such ingredients also inhibit discoloration (darkening) as the result of Maillard browning reactions.

The present bakeable foam compositions additionally include a non-sugar humectant in a weight ratio of sugar to humectants ranging from about 3:1 to about-12:1. Good results are generally obtained when the foams comprise about 2% of a humectant, preferably about 4-7%. Humectant addition to lower the water activity and thus is helpful in achieving the present essential water activity level and the microbial shelf stability at room temperature provided by the present food products as described more fully below. Humectants can also sweeten and tenderize the finished baked product. The present non-sugar humectant ingredient can be any commonly employed edible humectant ingredient. Preferred humectants are selected from a group consisting of glycerin, glycerol, mannitol, propylene glycol, sorbitol, xylitol, and mixtures thereof. Preferred for use herein is glycerin.

The present bakeable foam compositions depend on a structuring protein ingredients for body about 2%-6% (dry weight basis) of a structuring protein ingredient. Useful herein for the structuring protein ingredient are such ingredients such as whole egg, egg whites, egg replacers, nonfat dry milk, dried buttermilk, dried whey, milk protein concentrate, soy protein, gluten, casein, whey protein concentrate, and mixtures thereof, can be added to the foam to improve mouthfeel, flavor, and texture. Egg white (albumen) is the preferred structuring protein ingredient.

The present bakeable foam compositions additionally include about 2%-6% of a water-binding fiber ingredient. The water binding fiber ingredient is employed likewise as with the humectants ingredient to lower the water activity and thus is helpful in achieving the present essential water activity level and the microbial shelf stability at room temperature provided by the present food products as described more fully below. Useful herein as water binding fiber ingredients include oat fiber, citrus fiber, coconut fiber, cocoa powder, carboxymethyl cellulose, and mixtures thereof. Preferred for use herein are oat fiber, citrus fiber, and cocoa powder. Cocoa powder is the preferred fiber source especially for chocolate flavored product executions. Of course, selection of the particular fiber ingredient is also influenced by the desired end product's flavor and color of foam. Thus, for lightly colored foam products such as a lemon flavored foam, a lighter colored fiber ingredient can be selected such as citrus fiber and/or carboxymethyl cellulose or other lightly colored fiber ingredients.

The present bakeable foam comprise from about 10% to 25% of an edible fat or shortening ingredient. A shortening component adds richness to the eating properties of the finished baked goods. The particular fat constituent level will depend particularly upon the desired type of finished baked good desired and its properties. Preferably the shortening level ranges from about 15%-20% and for best results about 17%.

Conventional shortening materials are suitable for use as the shortening ingredient of the present foams. Such conventional shortening materials are well known in the baked goods art. The conventional shortenings useful herein include fatty glyceridic materials classified on the basis of their physical state at room temperature. Liquid shortenings or oils are usable and provide an advantage of ease or incorporation. Solid shortening is usable and provides an advantage of desirable mouthfeel upon consumption of the baked good. More commonly used are mixtures of liquid and solid shortenings. These mixtures are fluid or plastic depending, in part, on the level of solid fatty materials. Shortenings of this type comprise a liquid oil containing from about 2-26% normally solid fatty glycerides. This percentage corresponds to a solid content index, "SFI", at 70° F. and 4% to 6% at 100° F.

Fats are added to soften, improve volume, and tenderize the finished baked product thereby improving the overall eating quality. The fat source can be vegetable, animal, or synthetic. Such fats can include the following or combinations of the following: coconut oil, babassue oil, butter canola (rapeseed) oil, coconut oil, corn oil, cottonseed oil, lard, olive oil, palm kernel oil, peanut oil, poppyseed oil, safflower oil, sesame seed oil, soybean oil, sunflower seed oil, combinations thereof and the like. Although it is recommended that the fat used is a solid for ambient distribution, any physical state can be used: liquid, solid, or semisolid. Such forms include plastic shortenings, liquid shortenings, margarines, liquid oil, shortening chips, combinations thereof, and the like. Fats can be hydrous or anhydrous, hydrogenated, non-hydrogenated, partially hydrogenated, fractionated, stabilized with antioxidants or preservatives, flavored, colored, emulsified or combinations of these forms. Preferably, fats are added at a level from about 5% to about 30% by weight. Other suitable shortening materials and methods of shortening preparation are described in detail in Bailey "Industrial Oil and Fat Products," (3rd ed. 1964) which is incorporated herein by reference.

Mixtures of the above oils are usable as are solid fatty materials, such as saturated triglyceride fats. In general, from about 1.5 to 25% triglycerides which are solid at 70 F are added to a liquid oil. For certain embodiments, the preferred oils are soybean oil hydrogenated to an iodine value (IV) of from about 105 to 115, preferably about 107, corn oil, palm oil, hydrogenated palm oil, lard and tallow oils. Preferably, the oils used to prepare the shortening composition will contain only from about 1-7% hardstock. Hardstock is a hydrogenated triglyceride having an iodine value of 8 or less. Preferred hardstocks include hydrogenated soybean oil, hydrogenated cottonseed oil, hydrogenated palm oil and hydrogenated lard or tallow. In certain preferred embodiments, the shortening ingredient is low in trans fatty acids (i.e., less than 1% of the total fat of the shortening) and in certain embodiments free of trans fatty acids.

In a preferred embodiment, the shortening ingredient is an emulsified partially hydrogenated soybean oil having a melting point of greater than 45° C. (113° F.).

Some embodiments of the foams of the present invention can further comprise about 0.5-5% of emulsifiers. The shortening provides a convenient carrier for addition of emulsifiers to the foam. The emulsifiers aid the realization of baked goods with improved grain structure and texture in addition they aid in the creation and stabilization of small bubbles upon mechanical processing when making the foam structure. The emulsifiers are also useful to maintain the emulsion integrity of the foam over extended room temperature storage. However, in other variations, a portion of the emulsifiers can be prehydrated and added along with the other wet ingredients. In still other variations, the emulsifiers can be plated onto various solid carriers such as flour, starch, sugars, milk powders, and the like, and admixed in with the various dry ingredients in the method of preparing the foam.

The emulsifier typically comprises from about 1% to 20% of the shortening component, preferably about 2% to 15% and, in some embodiments, from about 3% to 6%. Emulsifiers may be prehydrated in an aqueous dispersion and added to the foam. The emulsifiers in other embodiments are part of an emulsion or dispersion with or without a fat component. Generally useful as emulsifier components of the shortening ingredient are partially esterified polyhydric compounds having surface active properties. This class of emulsifiers includes among others, mono and diglycerides of fatty acids, such as monopalmitin, monostearin, monoolein, and dipalmitin; partial fatty esters of glycols, such as propylene glycol monostearate; higher fatty acid esters of sugars, such as the partial palmitic and oleic acid esters of sucrose; and phosphoric and sulphuric acid esters, such as dodecylglyceryl ether sulfate and monostearin phosphate. Other examples include the partial esters of hydroxy carboxylic acid such as lactic, citric, and tartaric acids with polyhydric compounds, for example, glycerol lacto palmitate and the polyoxyethylene ethers of fatty esters of polyhydric alcohols, such as polyoxyethylene ether of sorbitan monostearate or distearate. Fatty acids alone or esterified with a hydroxy carboxylic acid, e.g., stearyl-2-lactylate are also useful.

Current consumer health trends favor reducing consumption of trans fatty acids and thus, in certain embodiments, preferred for use herein are fat ingredients that are low or even free of such trans fatty acids. To provide desired chemical and physical stability, all or a portion of the fat ingredient can thus be provided by those fats that are free of such trans fatty acids yet nonetheless provide desired levels of chemical and physical stability such as various tropical fats and blends thereof such as coconut oil, palm oil, palm kernel oil and mixtures thereof. However, current consumer trends also favor reduction consumption of fats that are high in saturated fats. Thus, to provide finished foam products that are low in saturated fats, in certain embodiments, such products are substantially free of tropical oils such as coconut oil, palm oil, palm or kernel oil or animal fats such as lard or tallow.

The present bakeable foam compositions can additionally comprise about 0.5-2% of common salt for taste. In certain variations, all or a portion of the sodium chloride NaCl can be replaced with potassium chloride KCl.

The present bakeable foam compositions comprise sufficient amounts of an edible organic acid or acid salt to provide a pH of the foam to a pH of about 6 or lower. Controlling the pH also improves product shelf life. A lower pH aids in preventing microbial growth. Ingredients such as citric acid, sorbic acid, lactic acid, mixtures thereof and the like can be used to lower the pH of the foam. Furthermore, a buffer can be added to regulate the pH of the foam. Such buffers include salts of acetates, lactates, phosphates, citrates, mixtures thereof and the like. In preferred variations, the foam includes sufficient amounts of edible organic acids and/or acid salts to provide a pH ranging from about 4.5 to 6. Good results are obtained when the pH control ingredient(s) range from about 0.01-2%.

Also, pH control of the foam is important to stability control when the foam includes certain particulates that are sensitive to pH over extended shelf storage. Moreover, undesirable browning can occur upon microwave heating and cooking if the pH is too high or insufficiently controlled. Such undesirable browning is particularly troublesome in connection with lightly colored foams wherein the browning if it occurs is more visually apparent.

The present bakeable foam compositions have a moisture content ranging from about 10% to 20%. Moisture is required in the foam to hydrate the ingredients, improve volume, improve mouthfeel and eating quality of the finished baked product, and disperse ingredients during mixing. The total moisture includes water provided with or associated with the various essential and optional ingredients. Thus, the moisture of the foam can be determined by summing up the water contained in each ingredient of the formulation. The total moisture can also be determined by a vacuum oven drying of the foams herein. Moisture can be added to the foam as water or added by ingredients containing water such as liquid whole eggs, margarine, corn syrups, and the like. The amount of moisture depends on the required shelf life. As hereinbefore mentioned, shelf life is dependent on the water activity, and can be varied by the level of water and humectant that is added to the foam. Therefore, the level of water and humectants must be balanced to achieve a desired water activity and at the same time meet the desired texture and taste. The foams of this application preferably contain about 10% to about 20% moisture The particular selection of ingredients and concentration are selected to provide foams having a water activity ($A_w$) ranging from about 0.60 to about 0.85. For some embodiments, the water activity is less than 0.80. Selection of such water activity value is important in achieving a balance between microbial shelf stability and foam handling characteristics. Water activity is reduced by using polyols such as glycerol and sorbitol; using little or no water to make the foam and by having salt, or sugar in the foam.

Inhibition of bacterial growth by lowering water activity ($A_w$) in conjunction with inhibiting mold growth by creating either a low oxygen packaging environment and or the application of antimycotic agents at effective batter pH values is sufficient to maintain shelf stability at room temperature. At pH<6.0 we don't need gas (in combination with sorbate), only need gas if pH≥6.0 (which may be needed for flavor acceptability).

To further illustrate other embodiments, the food articles of the present invention comprise an anti-mycotic ingredient such as sodium, potassium sorbate, calcium propionate, parabens, or propionic acid. Even though antimycotic agents are effective in preventing mold growth in absence of a low oxygen packaging atmosphere, addition of such anti-mycotic ingredients in conjunction with a low oxygen packaging environment is desired as an additional assurance in case the physical integrity of the food product is comprised and oxygen leaks into the head space. Concentration ranges for calcium propionate from (0% to 0.2%) or while parabens concentration ranges from 0-0.1% and potassium sorbate at 0-0.3%. Addition of antimycotic organic acids at effective batter pH values (<6.0) prevent mold growth even when batter is exposed to atmospheric oxygen concentrations (21%).

Ingredients that can enhance the nutritional value of the baked product can be added to the foam and include the following or combinations of the following: fiber, vitamins, proteins, minerals, fortified flour, fat replacers, soy, prebiotics, nutraceuticals, and the like.

Inclusions can be added to the foam and include the following or combinations of the following: nuts, chocolate, shortening flakes, oats, flavored bits, caramel, fruits, butterscotch, and the like. If using a flavored bit, the bit can be fat-based to minimize dissolution during storage. Inclusions may contain a protective coating (e.g. hydroxypropyl cellulose) for protection against fat or moisture migration. Generally, inclusions, if they are included in the formulation, are added at a level from about 2% to about 25%.

Other ingredients, known to those skilled in the art, can be added to the foam to help improve color, flavor, or quality. Such ingredients include flavors, colors, molasses, salt, sweeteners, high intensity sweeteners, cocoa, cornmeal, corn flour, spices, and the like.

The foam products of the present invention do not require a conventional activated acid/soda chemical leavening system., Indeed, the present foams are desirably free (i.e., contain less than 0.5%) of such added chemical leavening systems (i.e., are non chemically leavened) since even if encapsulated will interact with the moisture leading to an increase in the pH. Such increase in pH over storage life can lead to multiple problems including mold growth, poor eating qualities in the finished baked good. Additionally, pre-reaction of the leavening agents leads to release of $CO_2$ into the package container and undesirable swelling of the package film lid. Likewise, the present foams are desirably free of inert gas leavening ingredients such as nitrous oxide.

The present methods of preparation include commercial preparation methods including the steps of forming or admixing the formulation ingredients into a uniform plastic blend capable of being pumped, e.g. heated to increase fluidity,; cooling the blend; and, aerating to form the present bakeable foam products.

The first essential step is a blending of the essential and optional foam formulation ingredients to form a uniform admixture. Conveniently, the blending step can include a first sub-step of forming or pre-blending a pre-blend of dry ingredients, a second sub-step of forming a pre-blend of liquid ingredients, and a third sub-step of melting the shortening ingredient and admixing therewith desired emulsifiers to form an emulsifier shortening pre-blend. Thereafter, the blending step can involve admixing the first dry ingredients pre-blend, the liquid ingredients pre-blend and the melted shortening pre-blend can be admixed together to form the uniform mixture or blend.

In commercial practice, a ribbon blender is particularly suitable for use herein to perform the uniform blending step. In another variation, the blending step is practiced by smizing. The term "smizing" as used herein refers to submitting the ingredients to high shear conditions, for example, using a turbilizer and/or finisher. Typically, smizing is performed within existing mixing equipment, as part of the mixing steps (as opposed to a separate unit operation). Smizing is well known in the baked goods art and the skilled artisan will have no difficulty in selecting useful equipment to practice such a step or operation.

As a result of the mechanical energy of the blending step, the blend can be and generally is heated to temperatures that can well exceed 38° C. (100° F.) forming a hot blend that requires cooling for further processing. Of course, for those production methods that do not result in the such overheating, the cooling step can be eliminated or at least reduced.

The present methods can include a cooling step to remove excess heat. The cooling step involves preferably rapidly cooling the hot blend to a temperature of about 30-35° C. (85-93° F.) or lower to form a cooled blend. While not wishing to be bound by the proposed theory, it is speculated that the principle of this cooling step is to convert the molten shortening in the hot blend into plastic shortening in situ after it has been dispersed in the hot blend. The rapid cooling step promotes the fat crystallizing desirably into a beta prime crystalline form. Rapid cooling promotes the desirable growth in the shortening of beta prime tending fat crystals which better hold the to-be-added inert gas within the small air cells. Such gas entrainment minimizes coalescence upon storage. For example, immediately after the blending step, the hot blend can be passed through a swept surface heat exchanger and cooled to less than 38° C. (100° F.). A suitable device for this step referred to in the art as a "Votator" is described in U.S. Pat. No. Re. 21,406 to C. W. Vogt, Mar. 19, 1940.

The present methods include a step of admixing the cooled blend with a gas or aerating whether air or nitrogen gas or other inert gas to form a gas/blend mixture. The gas can be simply sparged into the cooled blend. Any conventional technique can be used. For example, the gas can be forced through small orifices into the composition as the composition flows through a tube or vessel into a mixing chamber, where uniform distribution occurs. Any conventional nontoxic, odorless, tasteless propellant, such as air, nitrogen, nitrous oxide, carbon dioxide, and mixtures thereof can be used. Good results are obtained using about 1 g of $N_2$ per 100 g of blend (i.e., a weight ratio of about 1:100).

The present process 10 additionally comprises the step of aerating or whipping the cooled, gas/blend from a native density of about 1.3 g/cc to a density of about 0.6 to 1.1 g/cc, preferably about 0.75 to 1.1 g/cc. During aeration, it is important that the temperature be controlled by simultaneous cooling so that the foam product remains between about 50-60° C. during the aeration step. The cooling is needed to offset the heat generated in the foam during the aeration step. Maintaining the temperature to between 50-60° C. is important to maintaining the fat in the desired crystal state which, in turn, is important to minimizing air cell collapse upon extended storage. The preferred target temperature ranges between about 50-55° C.

It has been surprising found that it is important to maintain a backpressure during the aeration step ranging from about 138-758 KPa (20-110 psig) in order to obtain the desired cell size in the aerated foam product.

In terms of physical characteristics, the foams of the present invention are dimensionally stable at room temperature, deformable or non-elastic, closed cell, expandable, farinaceous un-gelatinized bakeable foams. By "dimensionally stable" herein is meant that unlike a fluid batter or a plastic dough, the present foams are more rigid in form. The foams although dimensionally stable are nonetheless deformable and can be measured to have a viscosity that ranges from about 450,000 to 550,000 cp at a temperature of 20-40° C. By "non-elastic" herein is meant that if compressed, the present foam collapse and does not spring back to recover it's initially volume before compression. The foam is in the form of on a closed cell aerated emulsion wherein the foam has an average cell size diameter of about 25 μm or less. The foam has a density ranging from about 0.6 to 1.1 g/cc. By "expandable" herein is meant that upon microwave cooking, the foam can and will generally expand to about 1.5-2.5× its initial volume. While not wishing to be bound by the proposed theory, it is speculated herein that the expansion of the foam results from steam generation during the microwave cooking step.

The foam can be packaged in a suitable moisture impermeable air tight package. In preferred embodiments characterized by foams having a pH values of <6.0 and comprising an anti-mycotic (such as 0.3% potassium sorbate), no inert packaging gas is required (i.e., the foam will not support mold growth when exposed to atmospheric oxygen concentrations of 21%.). The containers or packages (e.g., plastic cup, tubes, trays, pans, bowl, or tubs) should have a sufficient headspace to allow for expansion upon consumer microwave cooking preparation of the present finished baked good for distribution and sale. Good results are obtained when the headspace volume ranges from about 2-4× the volume of the foam deposited in the cup.

In highly preferred embodiments, the packaging step is practiced employing a depositor that employs using a gentle, low shear packaging with minimum piping in order to avoid collapse of the foam and within 15 minutes of aeration. Thereafter, the present methods can optionally include a step of flushing the bakeable foam filled cup with a low oxygen gas (e.g., $N_2$ and/or $CO_2$) and thereafter providing a gas impermeable sealing membrane. Oxygen scavengers also can be placed in the batter (i.e. glucose oxidase) or package to modify the atmosphere in the headspace surrounding the foam. The modified atmosphere aids in the prevention of mold growth; therefore, the pH of the foam can be increased to ≥6.0 and still achieve a shelf life of greater than 180 days. In other variations, the modified atmosphere headspace can be replaced with a partial vacuum. In the preferred embodiment (for cost considerations), wherein the foam pH is <6.0, the headspace is occupied by ordinary air.

Referring now to FIG. 1, there is depicted a packaged food product article 10 of the present invention comprising a container 12 including a body 13 such as the cup depicted having an open top end 14 and defining a cavity 15, and a bakeable foam 16 disposed within the cup cavity 15 defining a headspace 18, optionally a modified low oxygen atmosphere or vacuum 20 in the headspace 18, and a peelably removable, low gas (especially moisture) permeability sealing membrane 22 sealing the open end 14.

As can be seen, cup 13 includes a circular sidewall body 24 that can be tapered such as defined by and having a first or upper larger radius and a second lower smaller radius. Sidewall 24 can include an upper nesting collar 30. Collar 30 allows for convenience in nesting and de-nesting one cup from multiple nested cup units during commercial high speed filling and article fabrication. As can be seen, the nesting collar 30 is formed by a sidewall portion having a third even larger radius. Cup 13 additionally includes a sealing flange 34 peripherally extending around the open end and above the nesting collar 30. Cup 13 additionally includes a floor or bottom end 36 opposite the open end 14. Bottom end 36 can include a foot flange 38 for elevating the cup floor 36 when the cup is placed in a microwave oven chamber above the floor of the chamber. One skilled in the art recognizes that the cup can also be of a straightwall cylindrical configuration or even and inverted cup (e.g., having a frusto-conical shape). The sidewall shape whether tapered or cylindrical can also possess a more complex surface profile for aesthetics, handling, or other functional reasons (e.g., labeling). In still other variations, the circular sidewall can replaced by a polygonal equivalent (e.g., pentagon, hexagon or even octagon).

In preferred form, the cup cavity can have a total volume ranging from about 50 to 1250 cc. Such a volume can be provided by a cup 13 having a average radius ranging from about 27 mm to 53 mm. Such cups include a vertical height 40 ranging from about 35 to about 75 mm extending from the interior surface of bottom end 36 to the interior bottom surface of seal membrane 22.

Cup 13 can be fabricated from a temperature tolerant material, i.e. maintains its strength and shape integrity even at temperatures reached during microwave heating of the product even up to 125° C., such as plastic, whether thermoplastic or thermoset, metal such as aluminum or even temperature resistant paperboard. The material from which the cup is fabricated is preferably microwave transparent or inherently incorporates shielding materials in areas described herein that provide desired shielding effects. One thermoplastic preferred for use herein, the cup is fabricated from polypropylene (including about 1-5% ethyl vinyl alcohol for increase barrier properties). Such cups can be fabricated, when comprised of a thermoplastic material, by blow molding, thermoforming or injection molding in known manner. In one variation, cup 13 including floor 36 are of a single piece construction. In other variations, sidewall 24 and floor or base 36 are formed separately and joined together such as by common techniques as spin welding or sonic welding. The floor can be a lidding stock heat sealed to the sidewall or a cap threaded or snap fit lid attached to the sidewall.

In one variation, foot flange or ring 38 elevates the inner surface of bottom 36 about 1 to 15 mm above the microwave cavity for improved microwave heating performance in terms of insuring that the lower portion of the finished heated good is sufficiently cooked.

In other variations, the food charge can additionally include a second differently formulated bakeable foam shelf stable layer 42 or, more preferably, a second shelf stable layer in the form of a food topping layer. It will also be appreciated that the bakeable foam 16 can be of more than one layer, e.g., a first chocolate portion in the form of a first layer or section and then a second yellow cake portion in the form of a second layer or section. The portions can be different formulations or essentially equivalent (except for minor variations for color or flavor)

Additionally, in preferred form, those bakeable foam ingredients such as salt and water are controlled to provide a bakeable foam having suitable dielectric properties (i.e., where e*=e'-i e", and, ∈* is the complex permittivity
∈' is the permittivity (real part of the complex permittivity)
∈" is the dielectric loss factor (imaginary part of the complex permittivity)
i=square root of (−1)

The dielectric properties of the bakeable foam can be characterized by the complex permittivity at the microwave frequency of 2450 MHz, as measured using an Agilent 85070D Dielectric Probe Kit and an Agilent 8720ES Network Analyzer. When measured at 25 degrees C., the bakeable foam preferably has a relative permittivity (the real part of the complex permittivity) between 4 and 40. More preferably, the relative permittivity of the bakeable foam is between 6 and 20 and most preferably the relative permittivity of the bakeable foam is between 8 and 14.

When measured at 25° C., the bakeable foam 16 preferably has a relative dielectric loss factor (the imaginary part of the complex permittivity) 20 or less. More preferably, the relative dielectric loss factor of the bakeable foam is 12 or less and most preferably the relative dielectric loss factor of the bakeable foam is less than 0.5-8.

Microbial stability can also be a challenge in a shelf stable product. One common solution to controlling microbial growth is through pasteurization. However, the present invention lends to low microbial load at the time of packaging and formulation to gain the desired shelf life. Formulation can contain an anti-mycotic agent which can include sorbic acid and its derivatives such as sodium or potassium sorbate, propionic acid and its derivatives, vinegar, sodium diacetate, monocalcium phosphate, lactic acid, citric acid and so on. These agents are present in an amount to aid in the inhibition of growth of undesirable yeast and/or molds, typically about 0.01 to 1.0% of dry weight basis ingredient such as sodium propionate, potassium sorbate, calcium propionate, sorbic acid and mixtures thereof. The anti-mycotic ingredient can be present in a range of about 0.01% to about 1.0% on a dry weight basis.

The bakeable foam 16 is sealed within the container 12 by sealing membrane 22. Sealing membrane 22 is peelably secured to flange 34 such as with a cold or pressure adhesive to provide an hermetic (i.e., without a venting hole) seal to package 12. In one embodiment, the membrane 22 is fabricated from packaging film that is a single layer formed of a film or a single sheet. In another embodiment, the membrane is fabricated from other packaging film such as a laminate, a co-extrusion, coated or a combination thereof. Preferably, the membrane material is selected to be of low moisture permeability. Typical low moisture permeable packaging materials have an moisture permeability of less than about 0.1 cc/100 in$^2$/24 hr (@37.7° C.; @90% Rel. Humidity.). The laminate can be a flexible material comprising a polymer substrate selected from the group consisting of polyethylene (PE), polypropylene (PP), polyethylene terephthalate (PET), and polylactic acid (PLA), optionally an oxygen barrier layer, and a moisture barrier layer. In one embodiment, the laminate is a flexible material comprising a layer of polyester aluminum oxide coated polyester, and a peelable polypropylene sealant layer. In a further embodiment, the laminate comprises a moisture barrier coating exterior of an oxygen barrier coating.

Optionally, container 12 can include a lid (not shown), e.g., a flexible or rigid plastic member, overlaying sealing membrane 22 that engages the flange 34 such as with a friction fit to provide additional packaging protection, e.g., resealability.

The container 12 additionally includes a headspace above the foam 16, or, if a topping layer above the foam such as a frosting layer 42 is present, then above the topping layer. Prior to microwave heating (e.g., upon initial fabrication), the head space will have a partial volume or portion of the total volume. The headspace can be filled with air or low oxygen gas. In one variation, the headspace package atmosphere has an oxygen content of 2% or less, preferably about 1% or less, and for best results, 0.5% $O_2$ or less. Provision of a low oxygen (2% or less) headspace atmosphere is helpful in providing extended microbial stability to assist in providing the desirable extended shelf like at room temperature storage. However, in certain preferred embodiments such as when foam pH is adjusted to ≤6.0 and the foam includes adequate levels of an anti-mycotic ingredient, e.g., 0.3% potassium sorbate, then the packaged food article does not require a modified packaging atmosphere or materials of construction to maintain such an atmosphere. Of course, eliminating the need for such specialized packaging atmosphere reduces the cost and complexity of product manufacture.

Providing an internal partial vacuum (0.5-0.9 atm.) or a reduced headspace volume 18, such an indented sealing member (not shown), allows for expansion of the headspace gas 20 due to changes in altitude that can be experienced during shipping such as across mountain ranges to minimize the likelihood of rupturing the integrity of the seal closure of membrane 36.

While specific materials of construction can be used for the cup body 23 and for the sealing membrane 36, the overall construction of the sealed container 12 can be controlled to provide moisture barrier as well as, if desired, a low oxygen and $CO_2$ gas permeability properties.

Now that the basic construction of article 10 including foam 16 according to the preferred teachings of the present invention has been explained, preferred modes of use of article 10 according to the teachings of the present invention can be set forth.

The present articles are adapted to be used or heated by common consumer microwave ovens (typically ranging in power from about 500-1500 watts, based on commercially available improvements to wattage options as manufacturing optimization has evolved, and operating at 2450 MHz) for a specified time. Such variety in wattage options and availability creates difficulty in specifying cooking time for optimal raw foam cooking results. Microwave ovens commonly include one or more 'express cook' buttons that operate the microwave for specific time durations. Typically, such buttons will operate the microwave at full power for 30 seconds or one minute. In preferred form, the quantity of foam to be microwave cooked and the package design are combined to facilitate the use of the express cook buttons.

It is an advantage of the present articles that notwithstanding the range of power of various consumer microwave ovens or whether they are equipped with a carousel that the present articles exhibit sufficient preparation abuse tolerance such as to nonetheless provide consistently a high quality finished good even after extended room temperature storage. Also, even when the consumer inaccurately microwave cooks the article for a time different than specified in the preparation instructions sufficient tolerance is exhibited to provide a high quality finished good.

As the microwave article is microwave heated, the foam 16 warms sufficiently to develop steam to expand the foam. When the foam reaches the cooking temperature sufficient to denature the structural protein, the foam begins to set forming an expanded finished good structure. The cooking is desirably complete when the foam completes its foam to cake structure conversion (typically when internal temperatures are reached of approximately 100° C. and top surface temperatures ranging from about 105-115° C.). It is a further advantage of the present articles that the construction provides even heating and thus cooking of the foam 16. Such even heating provides for a desirable homogeneous texture in the finished good rather than regions of uncooked foam interspersed with overcooked regions.

To allow sufficient volume for expansion during microwave heating the ratio of VH to VB should be at least 1, i.e., VH/VB≥1 preferably 1.5-3, more preferably 2 or greater, e.g., 2.5.

Typically, in an optimal finished good, the moisture content ranges from about 95%-97% of the initial moisture content while moisture loss upon cooking of 10% or greater is indicative of over cooking.

In a preferred preparation technique, the sealing membrane 36 is completely removed to allow for gas escape during microwave cooking. In a preferred execution, sealing membrane 36 additionally includes a tab (not shown) to facilitate removal.

In another variation, the interior surface of cup 13 can include an anti-stick coating to facilitate removal of the finished good after microwave heating cooking. However, an advantage of the present foam formulations is that generally such anti-stick interior coating are unnecessary and the finished baked good generally easily releases from the cup.

In one variation, one or more articles 12 can be severably adjoined (not shown), e.g., six, to form a multi-pack product. Such multi-packs can be formed, for example by adjoining individual articles at their sealing flanges such as by including a breakable intermediate tab. In other minor variations, the tabs are co-extensive but include a fracture line or crease or score line to facilitate disengaging a single article from the multi-pack. In still other variations, two or more, e.g., four, articles can be co-packed to form a multi-pack by including an overwrap and/or a sleeve to secure the items together.

In still other less preferred variations, the shelf stable foam 16 can be substituted with equivalent amounts of foams intended for either refrigerated or frozen distribution and storage.

EXAMPLE 1

A bakeable foam of the present invention was prepared and analyzed for its viscosity profile at a fixed shear rate as a function of temperature.

The bakeable foam of the present invention was prepared from the following formulation:

| Ingredient | Weight % | Weight (g) |
|---|---|---|
| Drys | | |
| Soft Flour | 10.00 | 150.0 |
| Cocoa Powder | 6 | 90.0 |
| Sugar | 12.592 | 188.9 |
| Albumen | 2 | 30.0 |
| Soy protein isolate | 1.35 | 20.3 |
| Whey protein isolate | 0.84 | 12.6 |
| Potassium sorbate | 0.3 | 4.5 |
| Salt | 0.37 | 5.6 |
| Carrageenan | 0.083 | 1.25 |
| Vanilla flavor | 0.56 | 8.40 |
| Fat | | |
| Vegetable shortening | 17.21 | 258.15 |
| Emulsifier ("Grinsted GA 1350 K-A" from Danisco) | 0.50 | 7.5 |
| Liquid | | |
| Glycerine | 7 | 105.00 |
| Water | 16.095 | 241.43 |
| 63 DE corn syrup | 25.1 | 376.50 |

The above formulation was formed into a foam using the following procedure:
1) Boil water and combine formula amount indicated with corn syrup and glycerine. Mix into solution.
2) Melt shortening and emulsifier in microwave until temperature is 71° C. (~1 minute).
3) Combine melted shortening plus emulsifier with water, corn syrup, and glycerine.
4) Add combined materials described in step 3 with remaining formula ingredients in an appropriate mixing bowl and hand mix with spatula until dry ingredients are dispersed.
5) Used a table top mixer (KitchenAid Professional 600) equipped with a whipping attachment and mix complete foam for 90 seconds at speed 9.
6) Deposit batter into Brookfield rheometer sample container immediately after mixing (~14 gm) for viscosity analysis.

Figure 2:
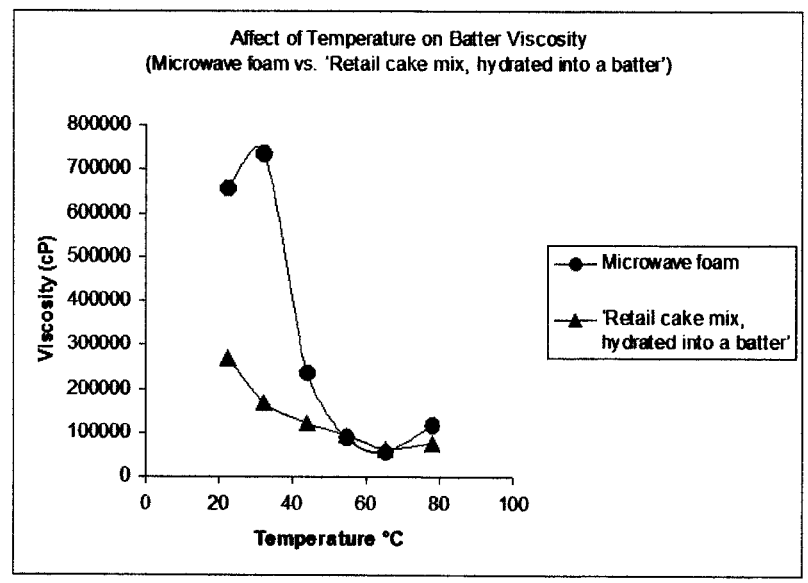
FIG. 2 is a graph.

Thereafter, the viscosity of the foam so formed was measured at various temperatures and the results of such testing are presented in graph form in the chart in FIG. 2. The viscosity data were obtained using the below described instruments and procedures:

Batter viscosity values were obtained employing a Brookfeild model DV-III ULTRA rheometer equipped with a #64 spindle, 13R sample container, and SC4-45Y jacketed sample sleeve. The sample sleeve was attached to a Haake K20 temperature bath employing silicone oil as the heating fluid (Boss silicone products 210H fluid). The fluid was pumped through the jacketed sleeve entering the bottom port and leaving through the top port. The Haake K20 temperature bath was turned on and allowed to reach the initial measurement temperature prior to initiating viscosity measurements. The Brookfield rheometer was next turned on and the set-up protocol was followed as dictated by the instrument programming. Foam samples as prepared as described above and a 14 g. sample was placed into a 13R sample container. The sample container was then inserted into the heated jacketed sleeve. The batter fill amount was adjusted such that the surface of the batter was even with the fill mark on the spindle. The sample temperature was allowed to equilibrate within the jacketed sleeve for 15 minutes prior to initiating spindle rotation. Subsequent to the aforementioned 15 minute temperature equilibration period, the Brookfield motor was set to 0.2 RPM and allowed to run for 5 minutes prior to recording the batter viscosity measurement at a given temperature setting. After recording the viscosity value of the batter, the Brookfield motor was turned off, a new temperature setting was set and the protocol outlined above was repeated. Viscosity measurements were recorded at 21.1, 32.3, 43.3, 54.4, 65.5, and 76.7° C. for the invention foam.

For comparison, a batter of the prior art was prepared and similarly analyzed for viscosity. Specifically, a dry mix commercially available, (a Betty Crocker® Super Moist® Cake Mix ("Devil's Food" flavor, i.e., dark chocolate) 18.25 oz. (464 g.) package). The dry mix was formed into a batter according to the package preparation directions by combining the cake mix with, 1⅓ cups water (270 g), ½ cup vegetable oil (~85 g), and 3 eggs in a mixing bowl. A hand held mixer was used to mix batter on low speed for 30 seconds and medium speed for 2 minutes. After mixing and aerating to form a conventional batter, as sample quantity(~14 g) of the batter so prepared deposit of batter into Brookfield rheometer sample container. A series of viscosity measurements were taken to provide a like type viscosity value profile. The results of the viscosity measurements are likewise presented in graph form on the chart of FIG. 2.

As can be seen from the data presented in FIG. 2, the foams of the present invention possess a unique temperature dependent viscosity profile compared to existing batter products. The foams of the present invention are dimensionally stable at room temperature. By "dimensionally stable" herein is meant that unlike a fluid batter or a plastic dough, the present foams are more rigid in form. The foams although dimensionally stable are nonetheless deformable and can be measured to have a viscosity that ranges from about 450,000 to 550,000 cp at a temperature of 20-40° C. Upon microwave heating to temperatures >40° C., the viscosity of the batter declines significantly (<450,000 cP.) thereby changing the physical state of the foam from that of being dimensionally stable to that of being deformable, i.e., expandable, and able to increase in volume in response to the generation of steam upon reaching the boiling point temperature of the batter aqueous phase. This unique temperature dependent viscosity profile of the invention is clearly evident upon comparison to the viscosity profile of batter made from a commercially available dry mix.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A food product, comprising:
a shelf stable, ready-to-cook, dimensionally stable, deformable non-elastic closed cell, expandable, farinaceous ungelatinized microwave bakeable dessert foam including:
5%-15% (dry weight basis) ungellatinized farinaceous ingredient;
20-50% (dry weight basis) of a nutritive carbohydrate sweetening ingredient;
1-7% of a non-sugar humectant;
2%-6% (dry weight basis) of an undenatured structuring protein ingredient;
2%-6% of a water binding fiber ingredient;
15%-20% (dry weight basis) of a fat ingredient including from 1.5 to 25% hydrogenated triglycerides;
0.5% to 4% salt; and,
sufficient amounts of an edible organic acid or acid salt to provide a pH of the foam to a pH of 4.5 to 7;
sufficient amounts of moisture to provide the foam with a total moisture content ranging from 10% to 20%;
wherein the foam has a water activity ranges from 0.60 to 0.85;
wherein the foam has a viscosity ranges from 400,000 to 550,000 cP. at a temperature of 20-40° C.;
wherein the foam has an average cell size diameter of 25 μm or less;
wherein the foam is free of a chemical leavening system; and
wherein the foam is free of $N_2O$.

2. The food product of claim 1 wherein the structuring protein ingredient is selected from the group consisting of whole egg, egg whites, egg replacers, nonfat dry milk, dried buttermilk, dried whey, milk protein concentrate, soy protein, gluten, casein, whey protein concentrate, and mixtures thereof.

3. The food product of claim 2 wherein the foam is unpasteurized and wherein at least a portion of the protein ingredient is egg white.

4. The food product of claim 3 wherein present non-sugar humectant ingredient is selected from the group consisting of glycerin, glycerol, mannitol, propylene glycol, sorbitol, xylitol, and mixtures thereof.

5. The food product of claim 4 wherein at least a majority of the structuring protein ingredient is undenatured egg whites.

6. The food product of claim 5 wherein the water binding fiber ingredients is selected from the group consisting of oat fiber, chicory root fiber, citrus fiber, coconut fiber, cocoa powder, carboymethyl cellulose, and mixtures thereof.

7. The food product of claim 6 wherein at least a portion of the water binding fiber ingredient is selected from the group consisting of citrus flour, oat fiber, cocoa and mixtures thereof.

8. The food product of claim 7 wherein the fat is an emulsified shortening and is present in a range of from 10%-20%.

9. The food product of claim 8
additionally comprising 0.1-4% cocoa;
having a viscosity ranging from 475,000-525,000 cP.; and
wherein the water activity ranges from 0.7 to 0.8; and
has an emulsifier content ranging from 0.01%-2%.

10. A packaged article for the microwave cooking preparation for a finished baked good exhibiting greater preparation abuse tolerance of overcooking, comprising:
a cup having:
a sidewall body having an inner and an outer major surface;
a bottom attached or extending from the sidewall defining a cup upper open end and an interior cavity;
a sealing surface proximate the open end;
wherein the cup is fabricated from temperature resistant material;
a sealing membrane covering the upper cup open end defining a headspace, said membrane being peelably removably sealed to the sealing surface forming an hermetic seal and wherein the membrane is fabricated from a moisture permeability sealing membrane material; and,
wherein the container has interior cavity having a volume ranging from 50 to 1250 cc., and,
wherein the cup has moisture permeability of greater than zero and less than 0.1 cc/100 $in^2$/24 hr (@37.7° C.; @90% Rel. Humidity) and,
an uncooked farinaceous ready-to-cook dimensionally stable, deformable non-elastic closed cell, expandable, farinaceous ungelatinized bakeable dessert foam disposed within the cup and including:
5%-15% (dry weight basis) ungellatinized farinaceous ingredient;
20-50% (dry weight basis) of a nutritive carbohydrate sweetening ingredient;
1-7% of a non-sugar humectant;
2%-6% (dry weight basis) of an undenatured structuring protein ingredient;
2%-6% of a water binding fiber ingredient;
15%-20% (dry weight basis) of a fat ingredient including from 1.5 to 25% hydrogenated triglycerides;
0.5% to 4% salt; and,
sufficient amounts of an edible organic acid or acid salt to provide a pH of the foam to a pH of 4.5 to 7;
sufficient amounts of moisture to provide the foam with a total moisture content ranging from 10% to 20%;
wherein the foam has a water activity ranges from 0.60 to 0.85;
wherein the foam has a viscosity ranges from 400,000 to 550,000 cP. at a temperature of 20-40° C.;
wherein the foam has an average cell size diameter of 25 μm or less;
wherein the foam is free of a chemical leavening system; and
wherein the foam is free of $N_2O$.

11. The packaged article of claim 10 in the form of a packaged food article, additionally comprising:
30-60 g of the bakeable dessert foam disposed within the cup.

12. The packaged article product of claim 11 wherein the foam has a water activity value ranging from 0.6-0.85.

13. The packaged article of claim 10 wherein the cup is fabricated from a microwave-safe thermo-formed plastic with moisture barrier properties;
wherein the cup additionally includes a nesting collar proximate the cup open end;
wherein in the bakeable dessert foam comprises at least a majority of the structuring protein ingredient is undenatured egg whites.

14. The packaged article of claim 13 adapted to prepare a finished baked good by microwave heating for 30-150 seconds.

15. The packaged article of claim 14 having a modified atmosphere.

16. The packaged article of claim 14 wherein the bakeable foam comprises a water binding fiber ingredients is selected from the group consisting of oat fiber, chicory root fiber, citrus fiber, coconut fiber, cocoa powder, carboymethyl cellulose, and mixtures thereof.

17. The packaged article of claim 13 wherein the bakeable foam comprises an emulsified shortening and is present in a range of from 10%-20%.

18. The packaged food article of claim 14 wherein the foam has a water activity ranging from 0.70-0.80 and wherein the foam has an initial volume and wherein the ratio of headspace volume to foam initial volume is at least 1.5:1.

19. The packaged article of claim 18 wherein the foam has a pH of <6.0 and the foam additionally comprises an antimycotic ingredient.

20. A method for making a bakeable foam, comprising the steps of:
A. admixing to form a plastic uniform mixture 5%-15% (dry weight basis) ungellatinized farinaceous ingredient;
20-50% (dry weight basis) of a nutritive carbohydrate sweetening ingredient;
1-7% of a non-sugar humectant;
2%-6% (dry weight basis) of an undenatured structuring protein ingredient;
2%-6% of a water binding fiber ingredient;
15%-20% (dry weight basis) of a fat ingredient including from 1.5 to 25% hydrogenated triglycerides;
0.5% to 4% salt; and,
amounts of an edible organic acid or acid salt to provide a pH of the foam to a pH of 4.5 to 7;
sufficient amounts of moisture to provide the foam with a total moisture content ranging from 10% to 20%;
B. blending to form a blend having a native density of 1.15 to 1.2 g/cc and a temperature of 110° F. to 116° F. (38° C. to 48° C.);
C. rapidly cooling the homogeneous blend to cool to a temperature of 70° F. to 90° F. (21° C. to 32° C.) within a residence time of 2 to 30 seconds, to form a cooled blend;
D. admixing a gas with the cooled blend; and
E. aerating the gas and cooled blend while cooling to form an aerated foam having a density of 0.75 to 1.1 g/cc and a temperature of 85 to 95° F. (29 to 35° C.) while maintaining a back pressure of 20-110 psig. to form an aerated microwavebakeable foam.

21. The method of claim 20 additionally comprising the step of:
F. depositing a quantity of the aerated foam in a sealed packaging container.

22. The method of claim 21 wherein the gas is air.

23. The method of claim 22 wherein the quantity ranges from 30-60 g.

24. The method of claim 23
wherein the foam has a water activity ranges from 0.60 to 0.80;
wherein the foam's viscosity ranges from 400,000 to 550,000 cP. at a temperature of 20-40° C.;
wherein the foam has an average cell size diameter of 25 μm or less; and,
wherein the foam is free of a chemical leavening system; and
wherein the foam is free of $N_2O$.

25. The food product of claim 1 wherein the edible organic acid or acid salt is included in an amount of 0.01-2% to provide a pH of the foam to a pH of <6.

26. The method of claim 20 wherein the edible organic acid or acid salt is included in an amount of 0.01-2% to provide a pH of the foam to a pH of <6.

* * * * *